United States Patent
Hsieh et al.

(10) Patent No.: US 10,141,750 B2
(45) Date of Patent: Nov. 27, 2018

(54) BATTERY APPARATUS WITH VOLTAGE-BALANCING CONTROL AND METHOD FOR CONTROLLING THE SAME

(71) Applicant: Cyber Power Systems Inc., Taipei (TW)

(72) Inventors: Hung-Ming Hsieh, Taipei (TW); Yung-Hao Peng, Taipei (TW); Shih-Chien Tang, Taipei (TW)

(73) Assignee: Cyber Power Systems Inc., Taipei (TW)

(*) Notice: Subject to any disclaimer, the term of this patent is extended or adjusted under 35 U.S.C. 154(b) by 29 days.

(21) Appl. No.: 15/603,553

(22) Filed: May 24, 2017

(65) Prior Publication Data

US 2018/0212441 A1 Jul. 26, 2018

(30) Foreign Application Priority Data

Jan. 24, 2017 (TW) .............................. 106102640 A

(51) Int. Cl.
*H02J 7/00* (2006.01)

(52) U.S. Cl.
CPC ............ *H02J 7/0016* (2013.01); *H02J 7/007* (2013.01); *H02J 7/0008* (2013.01); *H02J 7/0026* (2013.01); *H02J 7/0013* (2013.01); *H02J 2007/0067* (2013.01)

(58) Field of Classification Search
None
See application file for complete search history.

(56) References Cited

U.S. PATENT DOCUMENTS

| | | | | |
|---|---|---|---|---|
| 4,949,028 A * | 8/1990 | Brune | .................. | H02J 7/0026 320/116 |
| 8,174,237 B2 * | 5/2012 | Kosugi | ................. | B60L 3/0046 320/116 |
| 8,917,061 B2 | 12/2014 | Zhu | | |
| 9,077,198 B2 * | 7/2015 | Szepesi | ................. | H02J 7/0068 |
| 9,142,981 B2 * | 9/2015 | Kamata | ................. | H02J 7/0016 |
| 9,537,329 B2 * | 1/2017 | Pernyeszi | ............. | H02J 7/0014 |

* cited by examiner

*Primary Examiner* — Leigh M Garbowski
(74) *Attorney, Agent, or Firm* — Alan D. Kamrath; Kamrath IP Lawfirm, P.A.

(57) ABSTRACT

A battery apparatus with voltage-balancing control and a method controlling the same employ a voltage-balancing module, which balances voltage values of multiple series-connected batteries of the battery apparatus, and accumulates voltage difference values of each battery relative to reference voltage values to adjust an allowable discharge control parameter Duty for each battery. By virtue of a cycle for updating the Duty, voltage differences of the multiple series-connected batteries can be lowered below a preset value.

15 Claims, 7 Drawing Sheets

BATTERY APPARATUS WITH VOLTAGE-BALANCING CONTROL AND METHOD FOR CONTROLLING THE SAME

BACKGROUND OF THE INVENTION

1. Field of the Invention

The present invention relates to a battery apparatus with voltage-balancing control and a method for controlling the same, more particularly, to a battery apparatus and a method for controlling the same which employ a voltage-balancing module balancing voltage of multiple series-connected batteries by calculating an accumulated value of voltage differences of each battery of the battery apparatus to adjust an allowable discharge control parameter Duty of the battery.

2. Description of the Related Art

U.S. Pat. No. 8,917,061 and Chinese Patent Publication No. 102742112 in the same patent family disclose a discharge-balancing system for multiple series-connected rechargeable batteries. Each rechargeable battery is connected in parallel to a resistor and a switch. The discharge-balancing system uses a control unit to determine one of the multiple rechargeable batteries with a lowest voltage and activate or deactivate the switch in connection with each rechargeable battery according to a voltage difference between a voltage and a lowest voltage of each rechargeable battery so as to balance discharge of the multiple rechargeable batteries. However, the multiple rechargeable batteries may already have voltage differences therebetween and those voltage differences are intended to converge to smaller differences.

SUMMARY OF THE INVENTION

An objective of the present invention is to provide a battery apparatus with voltage-balancing control and a method for controlling the battery apparatus, which calculates a discharge control parameter to balance voltage of multiple series-connected batteries.

To achieve the foregoing objective, the battery apparatus with voltage-balancing control includes multiple series-connected batteries, a voltage-balancing module and a voltage detection cable assembly.

The multiple series-connected batteries are connected in series to a DC (Direct Current) interface, and are charged thereto and discharge therefrom via the DC interface.

The voltage-balancing module has a processor, multiple voltage-balancing control circuits and multiple voltage detection circuits.

The voltage detection cable assembly has multiple voltage detection cables and a ground cable.

The voltage-balancing module detects voltage of the multiple series-connected batteries by virtue of the multiple voltage detection cables and the ground cable.

Each voltage detection circuit serves to detect a voltage value $V_n$ of a respective one of the series-connected batteries.

The processor of the voltage-balancing module calculates an allowable discharge control parameter Duty of each battery and controls a corresponding voltage-balancing circuit to perform battery discharge of the battery according to the allowable discharge control parameter Duty for voltage of the series-connected batteries to be balanced, and equation for calculating the allowable discharge control parameter Duty of each battery is given by:

$$Duty = K_p * Vdiff1 + K_i * V(t)$$

where

Duty is a time duration while battery discharge of the corresponding battery is continuously activated and is controllable through pulse width modulation (PWM);

$K_p$ and $K_i$ are engineering parameters;

equation for calculating a first voltage difference value Vdiff1 is: $Vdiff1 = V_n - Vref1$;

equation for calculating a voltage value at a time t, $V(t)$, is: $V(t) = \int_0^t Vdiff\,2$;

equation for calculating a second voltage difference value Vdiff2 is: $Vdiff2 = V_n - Vref2$; and Vref1 and Vref2 are a first reference voltage value and a second reference voltage value respectively.

To achieve the foregoing objective, a battery apparatus with voltage-balancing control has multiple series-connected batteries and a voltage-balancing module having a processor, multiple voltage-balancing control circuits and multiple voltage detection circuits, and the method for controlling the battery apparatus includes steps of:

detecting multiple voltage values $V_n$ of the respective series-connected batteries through the multiple voltage detection circuits;

calculating a first voltage difference value Vdiff1 of each series-connected battery through the processor, wherein equation for calculating the Vdiff1 is $Vdiff1 = V_n - Vref1$, and equation for calculating the value Vref1 is $Vref1 = V_{min}$, where $V_{min}$ is a minimum of the multiple voltage values $V_n$ of the series-connected batteries;

calculating a second voltage difference value Vdiff2 of each series-connected battery through the processor, wherein equation for calculating the Vdiff2 is $Vdiff2 = V_n - Vref2$, and equation for calculating the Vref2 is $Vref2 = V_{min} + Voffset$, wherein Voffset is a design value;

calculating a voltage value $V(t)$ at a time t of each series-connected battery through the processor, wherein equation for calculating the $V(t)$ is $V(t) = \int_0^t Vdiff\,2$ and $V(t)$ is an accumulated value of every calculation since the beginning;

calculating an allowable discharge control parameter Duty of each series-connected battery through the processor, wherein equation for calculating Duty of each series-connected battery is $Duty = K_p * Vdiff1 + K_i * V(t)$, wherein $K_p$ and $K_i$ are engineering constants, and each Duty is a time duration while battery discharge of a corresponding battery is continuously activated and is controllable by way of pulse width modulation (PWM);

controlling the multiple voltage-balancing control circuits to perform battery discharge of the series-connected batteries through the processor to balance the voltage values of the series-connected batteries; and repeating the foregoing steps to update each Duty until a difference between each two of the multiple series-connected batteries B1-Bn is lowered below a preset value.

To achieve the foregoing objective, a battery apparatus with voltage-balancing control has multiple series-connected batteries and a voltage-balancing module having a processor, multiple voltage-balancing control circuits and multiple voltage detection circuits, and the method for controlling the battery apparatus includes steps of:

detecting multiple voltage values $V_n$ of the respective series-connected batteries through the multiple voltage detection circuits;

calculating a first voltage difference value Vdiff1 of each series-connected battery through the processor, wherein equation for calculating the Vdiff1 is Vdiff1=Vn−Vref1, and equation for calculating the value Vref1 is Vref1=Vave, wherein Vave is an average voltage value of the multiple series-connected batteries;

calculating a second voltage difference value Vdiff2 of each series-connected battery through the processor, wherein equation for calculating the Vdiff2 is Vdiff2=Vn−Vref2, and equation for calculating the Vref2 is Vref2=Vave;

calculating a voltage value V(t) at a time t of each series-connected battery through the processor, wherein equation for calculating the V(t) is $V(t)=\int_0^t Vdiff\,2$ and V(t) is an accumulated value of every calculation since the beginning;

calculating an allowable discharge control parameter Duty of each series-connected battery through the processor, wherein equation for calculating Duty of each series-connected battery is Duty=Kp*Vdiff1+Ki V(t), wherein Kp and Ki are engineering constants, and each Duty is a time duration while battery discharge of a corresponding battery is continuously activated and is controllable by way of pulse width modulation (PWM);

controlling the multiple voltage-balancing control circuits to perform battery discharge of the series-connected batteries through the processor to balance the voltage values of the series-connected batteries; and repeating the foregoing steps to update each Duty until a difference between each two of the multiple series-connected batteries is lowered below a preset value.

The benefits of the present invention reside in the voltage-balancing module capable of balancing voltage of the multiple series-connected batteries by calculating an accumulated value of voltage differences of each battery of the battery apparatus to adjust an allowable discharge control parameter Duty of the battery, such that voltage differences of the multiple series-connected batteries can be lowered below a preset value.

Other objectives, advantages and novel features of the invention will become more apparent from the following detailed description when taken in conjunction with the accompanying drawings.

DETAILED DESCRIPTION OF THE INVENTION

Figure 1:
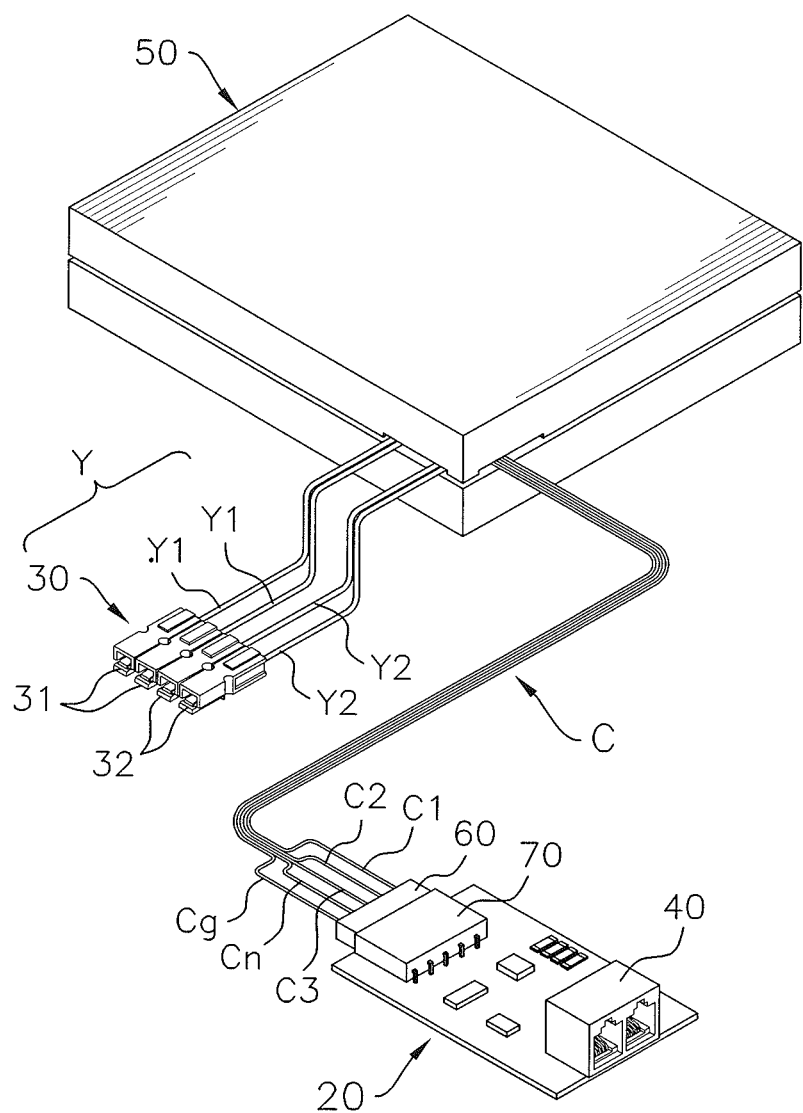
FIG. 1 is a schematic perspective view of a battery apparatus with voltage-balancing control in accordance with the present invention.

With reference to FIGS. 1 to 4, a first embodiment of a battery apparatus with voltage-balancing control in accordance with the present invention includes multiple series-connected batteries B1-Bn, a voltage-balancing module 20 and a voltage detection cable assembly C. The multiple series-connected batteries B1-Bn are connected in series with a DC (Direct Current) interface 10 to be charged thereto and discharge therefrom via the DC interface 10. The voltage-balancing module 20 has a processor P, multiple voltage-balancing control circuits E1-En, and multiple voltage detection circuits D1-Dn. The voltage detection cable assembly C has multiple voltage detection cables C1-Cn and a ground cable Cg. The voltage-balancing module 20 detects voltage of the multiple series-connected batteries B1-Bn by virtue of the multiple voltage detection cables C1-Cn and the ground cable Cg. Each voltage detection circuit D1-Dn serves to detect a voltage value Vn of a respective one of the series-connected batteries B1-Bn. The processor P calculates an allowable discharge control parameter Duty of each battery B1-Bn and controls a corresponding voltage-balancing circuit E1-En to perform battery discharge of the battery B1-Bn according to the allowable discharge control parameter Duty for voltage of the series-connected batteries B1-Bn to be balanced. Equation for calculating the allowable discharge control parameter Duty of each battery B1-Bn is given by:

$$Duty=Kp*Vdiff1+Ki*V(t)$$

where

Duty is a time duration while battery discharge of the corresponding battery B1-Bn is continuously activated and is controllable through pulse width modulation (PWM);

Kp and Ki are engineering parameters;

Equation for calculating a first voltage difference value Vdiff1 is: Vdiff1=Vn−Vref1;

Equation for calculating a voltage value at a time t, V(t), is: $V(t)=\int_0^t Vdiff\,2$;

Equation for calculating a second voltage difference value Vdiff2 is: Vdiff2=Vn−Vref2; and Vref1 and Vref2 are a first reference voltage value and a second reference voltage value respectively.

As for calculation of each Vref1 and each Vref2, equation for calculating Vref1 is Vref1=Vmin, where Vmin is a minimum value of the multiple voltage values Vn, and equation for calculating Vref2 is Vref2=Vmin+Voffset, where the value of Voffset ranges from 0 to 100 mV. Kp may be a constant of proportionality, Ki may be a constant of integration, and a cycle for updating each Duty is a time duration from 1 second to 1 minute.

Another way of calculating each Vref1 and each Vref2 is given as follows. Equation for calculating each Vref1 and each Vref2 is Vref1=Vref2=Vave, where Vave is an average value of the voltage values Vn of the series-connected batteries B1-Bn. Likewise, Kp may be a constant of proportionality, Ki may be a constant of integration, and a cycle for updating each Duty is a time duration from 1 second to 1 minute.

As elaborated below, the multiple series-connected batteries B1-Bn are connected in series to each other through a power cable assembly Y and multiple series-connected cables W1-Wx. The power cable assembly Y has a power connector assembly 30, at least one first power cable Y1 and at least one second power cable Y2. The at least one first power cable Y1 is electrically connected to a positive electrode B11 of the first one of the series-connected batteries B1. The at least one second power cable Y2 is electrically connected to a negative electrode Bn2 of the Nth one of the series-connected batteries Bn where N is an integer. The series-connected cables W1-Wx are used to connect the series-connected batteries B1-Bn in series. The power connector assembly 30 is electrically connected to the DC interface 10. The multiple series-connected batteries B1-Bn are charged and discharge power thereof through the DC interface 10. Given four series-connected batteries as an example, a first one of the series-connected cables W1 is electrically connected to a negative electrode B12 of the first one of the series-connected batteries B1 and a positive electrode B21 of a second one of the series-connected batteries B2. A second one of the series-connected cables W2 is electrically connected to a negative electrode B22 of the second one of the series-connected batteries B2 and a positive electrode B31 of a third one of the series-connected batteries B3. Same analogy applies for connection of the rest of the series-connected cables W3. Besides, the power connector assembly 30 may be integrally formed with a case or may include at least one first power connector 31 and at least one second power connector 32. The multiple series-connected batteries B1-Bn may be received in a battery box 50 with the power cable assembly Y extending outwards beyond the battery box 50.

Description about electrical connection among the voltage-balancing module 20, the voltage detection cable assembly C and the multiple series-connected batteries B1-Bn is introduced as follows. The multiple voltage detection cables C1-Cn and the voltage-balancing module 20 may be electrically connected through a third connector 60 and a fourth connector 70. A first one of the voltage detection cables C1 is electrically connected to the positive electrode B11 of the first one of the series-connected batteries B1 and a first line L1 of the voltage-balancing module 20, a second one of the voltage detection cables C2 is electrically connected to the negative electrode B12 of the first one of the series-connected batteries B1 and a second line L2 of the voltage-balancing module 20, a third one of the voltage detection cables C3 is electrically connected to the negative electrode B22 of the second one of the series-connected batteries B2 and a third line L3 of the voltage-balancing module 20, and same analogy applies for connection of the rest of the voltage detection cables. A first one of the voltage-balancing control circuits E1 is electrically connected to the first line L1 and the second line L2. A first one of the voltage detection circuits D1 is electrically connected to the first line L1 and the second line L2. A second one of the voltage-balancing control circuits E2 is electrically connected to the second line L2 and the third line L3. A second one of the voltage detection circuits D2 is electrically connected to the second line L2 and the third line L3. Same analogy applies for connection of the rest of the voltage detection circuits. Furthermore, a DC to DC circuit 21 may be electrically connected to any line L1-Ln of the voltage-balancing module 20 to supply power to the processor P. A ground line Lg of the voltage-balancing module 20 is electrically connected to a negative electrode Bn2 of a Nth one of the series-connected batteries Bn through the ground cable Cg. The multiple voltage-balancing control circuits E1-En and the multiple voltage detection circuits D1-Dn may be connected to the ground line Lg.

Speaking of operation of the battery apparatus in accordance with the present invention, the DC interface 10 of the battery apparatus may be installed but is not limited to be installed in an uninterruptible power supply (UPS). The UPS includes an AC (Alternating Current) input terminal 11, a battery charger 12, a DC to AC inverter 13, a switch 14, an AC output terminal 15, an MCU (Microcontroller Unit) 16, a surge suppressor 17, and a filter 18. The multiple series-connected batteries B1-Bn are connected in series to the DC interface 10. The AC input terminal 11 is connected to the mains power. The battery charger 12 is used to charge the multiple series-connected batteries B1-Bn through the DC interface 10. The voltage-balancing module 20 balances voltage of the multiple series-connected batteries B1-Bn. In case of power outage or breakdown, the MCU 16 of the UPS controls the switch 14 to connect the DC to AC inverter 13 and the AC output terminal 15, and a discharge path of the multiple series-connected batteries B1-Bn sequentially goes through the DC interface 10, the DC to AC inverter 13, the switch 14 and the AC output terminal 15. When mains power recovers, the MCU 16 restores an original state of the switch 14 to establish a mains power supply path sequentially going through the AC input terminal 11, the surge suppressor 17, the filter 18 and the AC output terminal 15. Moreover, the voltage-balancing module 20 may further have a communication port 40, and the MCU 16 of the UPS may be connected to an indicator 19 to display voltage-balancing status or voltage-balancing information. For example, the processor P of the voltage-balancing module 20 may transmit the voltage value Vn of each series-connected battery B1-Bn and the allowable discharge control parameter Duty to the MCU 16 of the UPS for the indicator 19 to display the voltage value Vn and the allowable discharge control parameter Duty of each series-connected battery B1-Bn.

Figure 5:
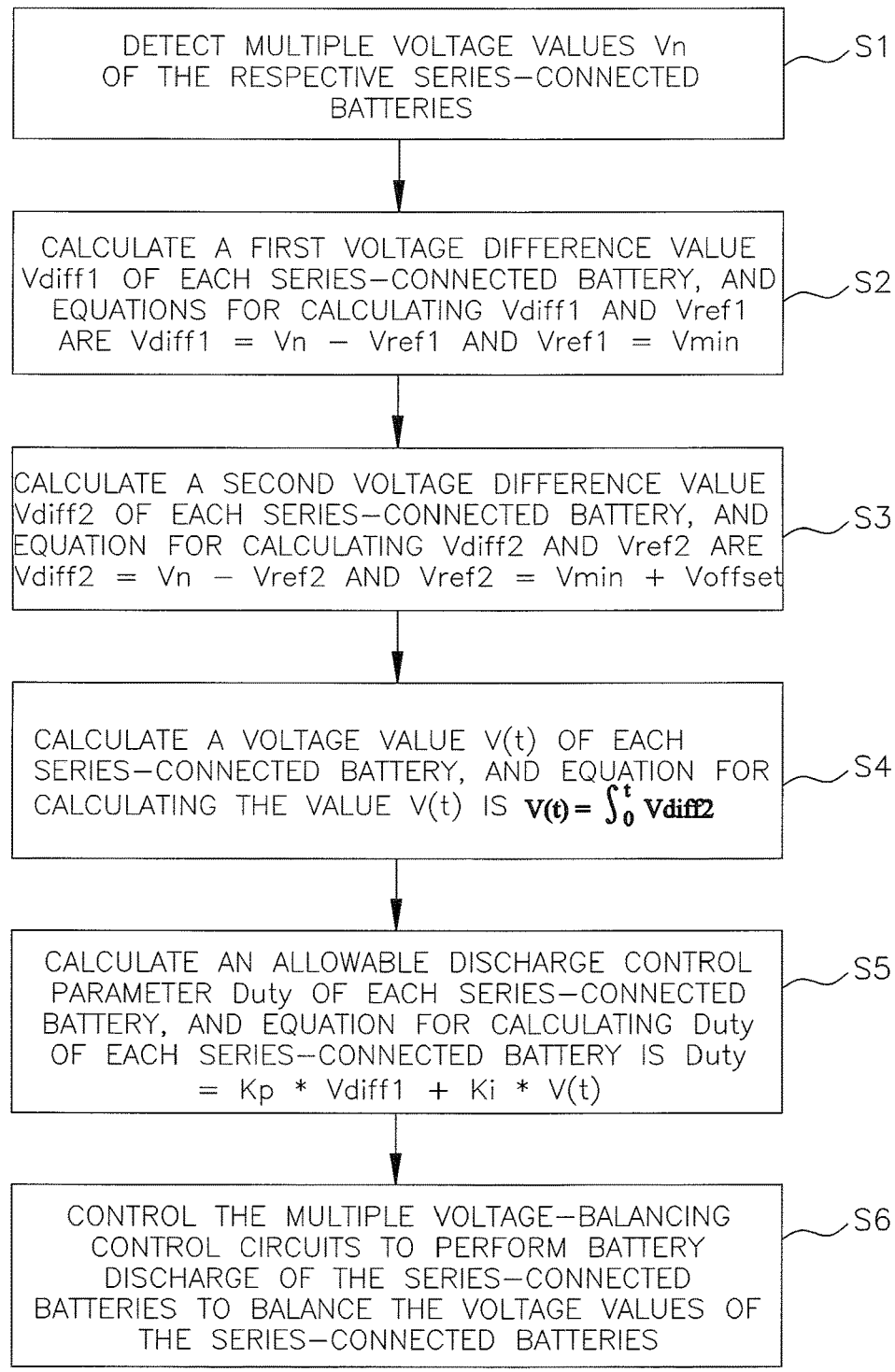
FIG. 5 is a flow diagram of a first embodiment of a method for controlling the battery apparatus in FIG. 2.

With further reference to FIG. 5, a first embodiment of a method for controlling a battery apparatus with voltage-balancing control in accordance with the present invention includes the following steps.

Step S1: The multiple voltage detection circuits D1-Dn of the voltage-balancing module 20 detect multiple voltage values Vn of the respective series-connected batteries B1-Bn.

Step S2: The processor P of the voltage-balancing module 20 calculates a first voltage difference value Vdiff1 of each series-connected battery B1-Bn. Equation for calculating the first voltage difference Vdiff1 is Vdiff1=Vn−Vref1, and equation for calculating the first reference voltage value Vref1 is Vref1=Vmin, where Vmin is a minimum of the multiple voltage values Vn of the series-connected batteries B1-Bn.

Step S3: The processor P calculates a second voltage difference value Vdiff2 of each series-connected battery B1-Bn, equation for calculating the second voltage difference Vdiff2 is Vdiff2=Vn−Vref2, and equation for calculating the second reference voltage value Vref2 is Vref2=Vmin+Voffset, where Voffset is a design value ranging from 0 to 100 mV.

Step S4: The processor P calculates a voltage value V(t) at a time t of each series-connected battery B1-Bn, and equation for calculating the value V(t) is $V(t)=\int_0^t Vdiff2$ (An accumulated value of every calculation since the beginning).

Step S5: The processor P calculates an allowable discharge control parameter Duty of each series-connected battery B1-Bn, and equation for calculating Duty of each series-connected battery B1-Bn is Duty=Kp*Vdiff1+Ki*V(t), where Kp and Ki are engineering constants (e.g. Kp is a constant of proportionality and Ki is a constant of integration), and each Duty is a time duration while battery discharge of a corresponding battery B1-Bn is continuously activated and is controllable by way of pulse width modulation (PWM). A cycle for updating each Duty is a time duration ranging from 1 second to 1 minute.

Step S6: The processor P controls the multiple voltage-balancing control circuits E1-En to perform battery discharge of the series-connected batteries B1-Bn to balance the voltage values of the series-connected batteries B1-Bn.

Steps S1-S6 are repeated every cycle for updating each Duty to update each Duty until a difference between each two of the multiple series-connected batteries B1-Bn is lowered below a preset value.

Figure 6:
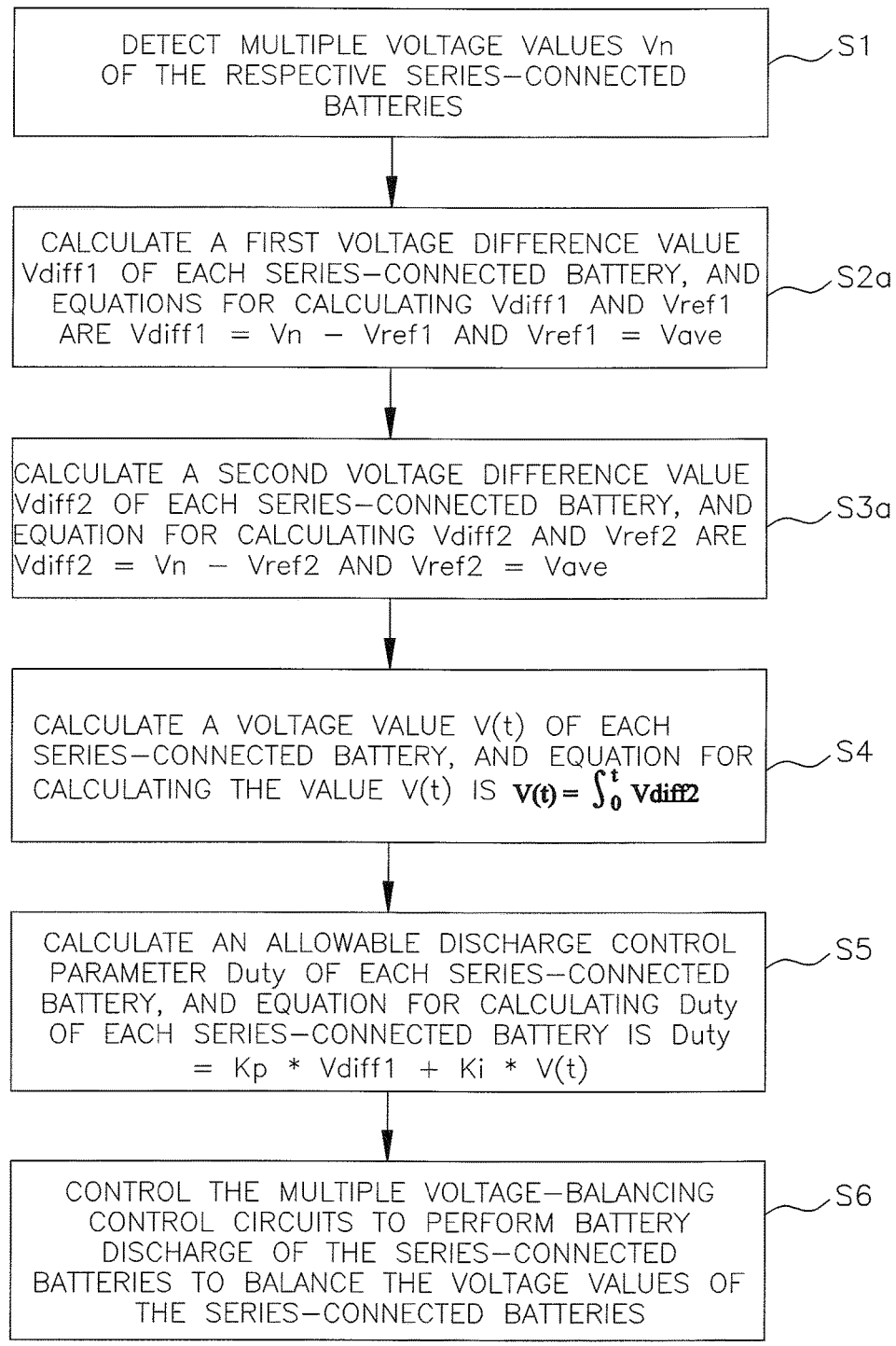
FIG. 6 is a flow diagram of a second embodiment of a method for controlling the battery apparatus in FIG. 2.

With reference to FIG. 6, a second embodiment of a method for controlling a battery apparatus with voltage-balancing control in accordance with the present invention differs from the first embodiment of the method in step S2a and step S3a. In step S2a the processor P of the voltage-balancing module 20 calculates the first voltage difference Vdiff1 of each series-connected battery B1-Bn, and equation for calculating Vdiff1 is Vdiff1=Vn−Vref1. Equation for calculating the first reference voltage value Vref1 is Vref1=Vave, and Vave is an average voltage value of the multiple series-connected batteries B1-Bn. In step S3a the processor P calculates the second voltage difference Vdiff2 is Vdiff2=Vn−Vref2. Equation for calculating the second reference voltage value Vref2 is Vref2=Vave, and Vave is the average voltage value of the multiple series-connected batteries B1-Bn.

Figure 2:
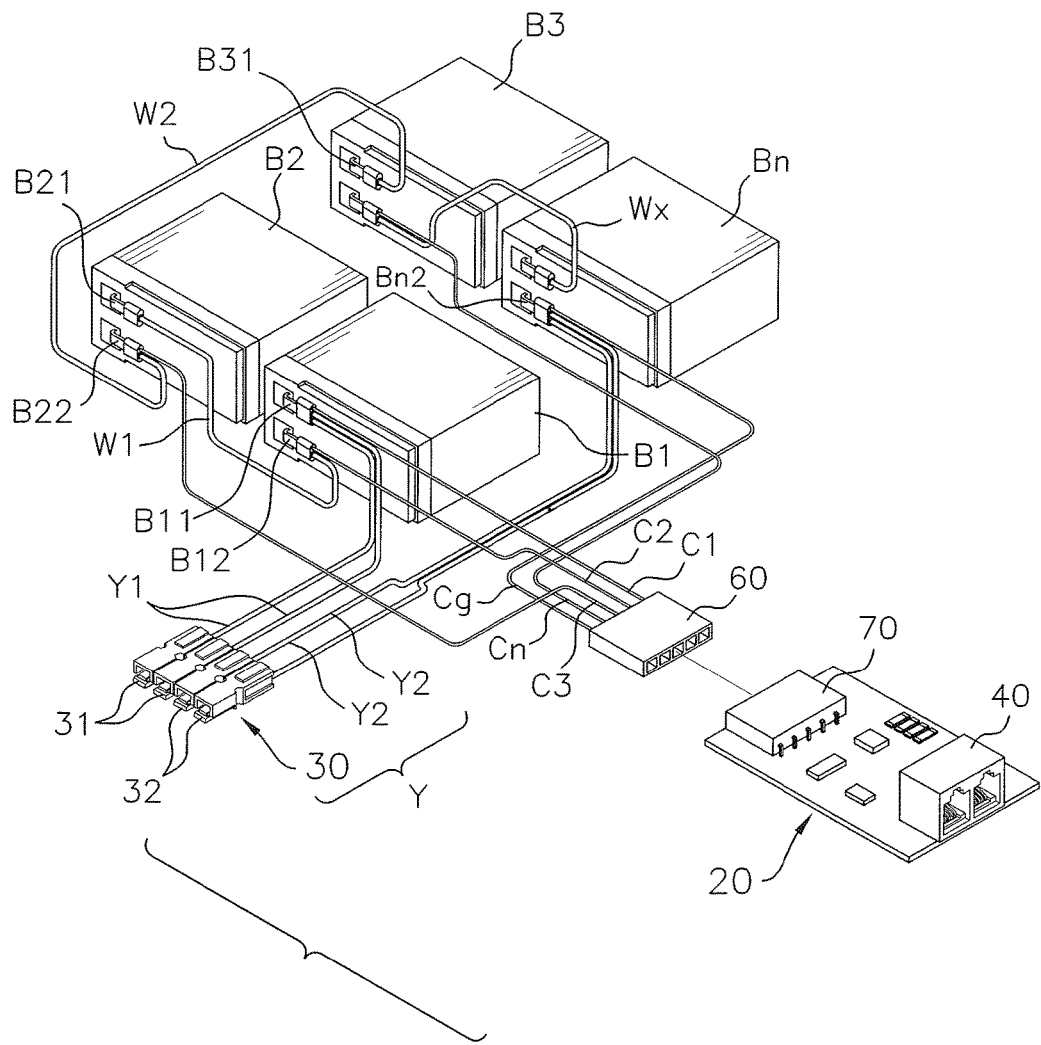
FIG. 2 is an exploded perspective view of the battery apparatus in FIG. 1.
Figure 3:
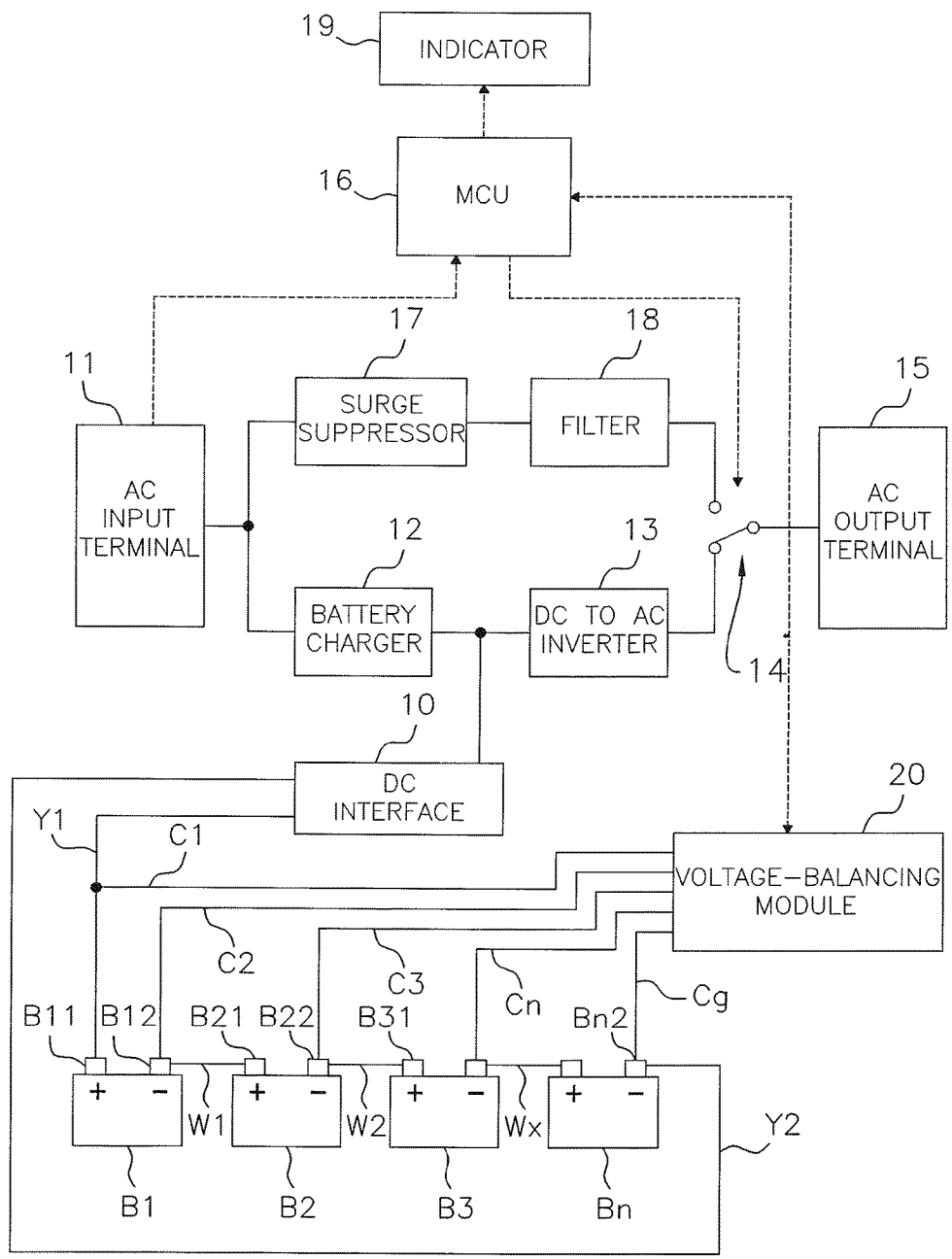
FIG. 3 is a functional block diagram of a first embodiment of the battery apparatus in FIG. 2 in collaboration with a UPS system.
Figure 4:
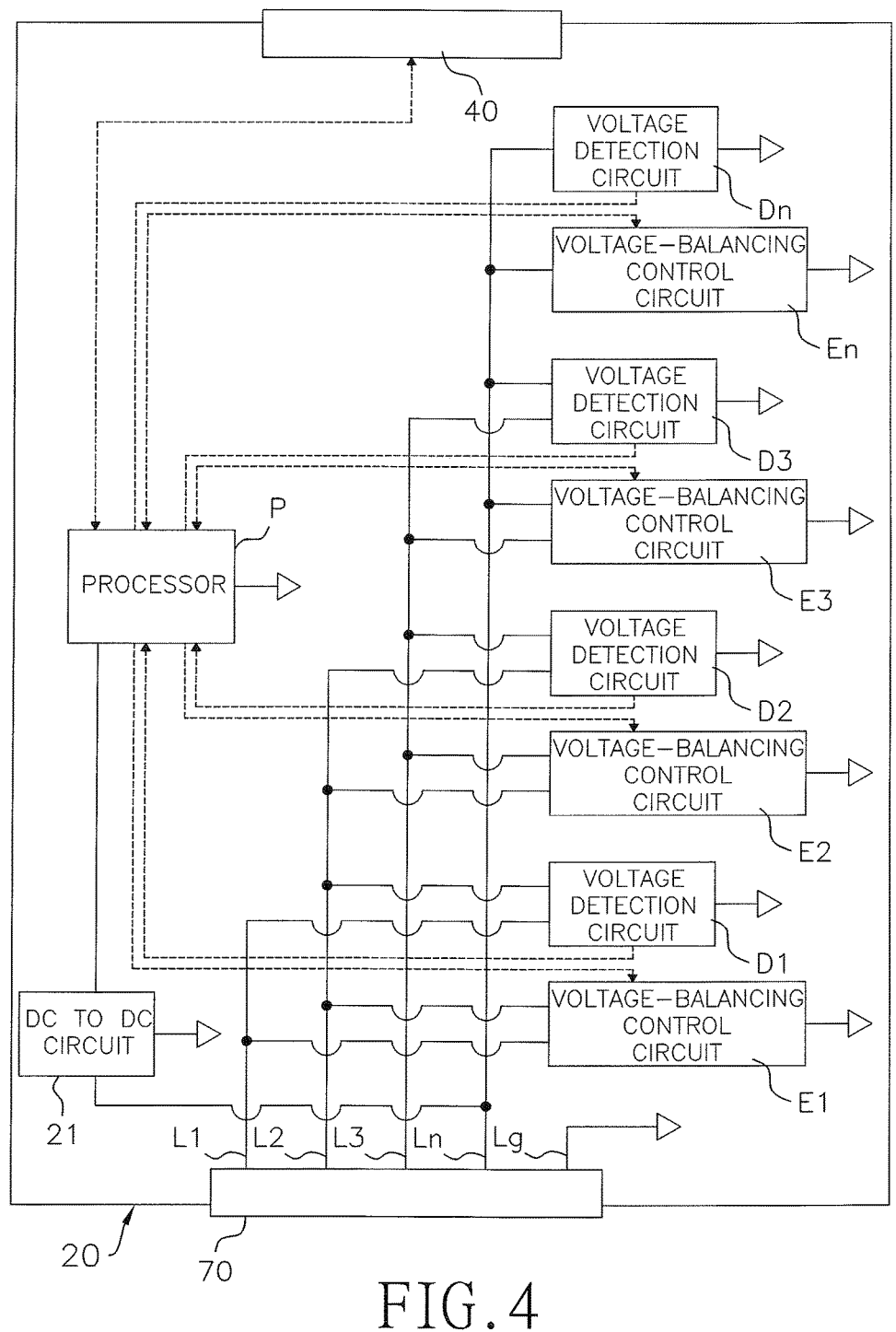
FIG. 4 is a functional block diagram of a voltage-balancing module of the battery apparatus in FIG. 3.
Figure 7:
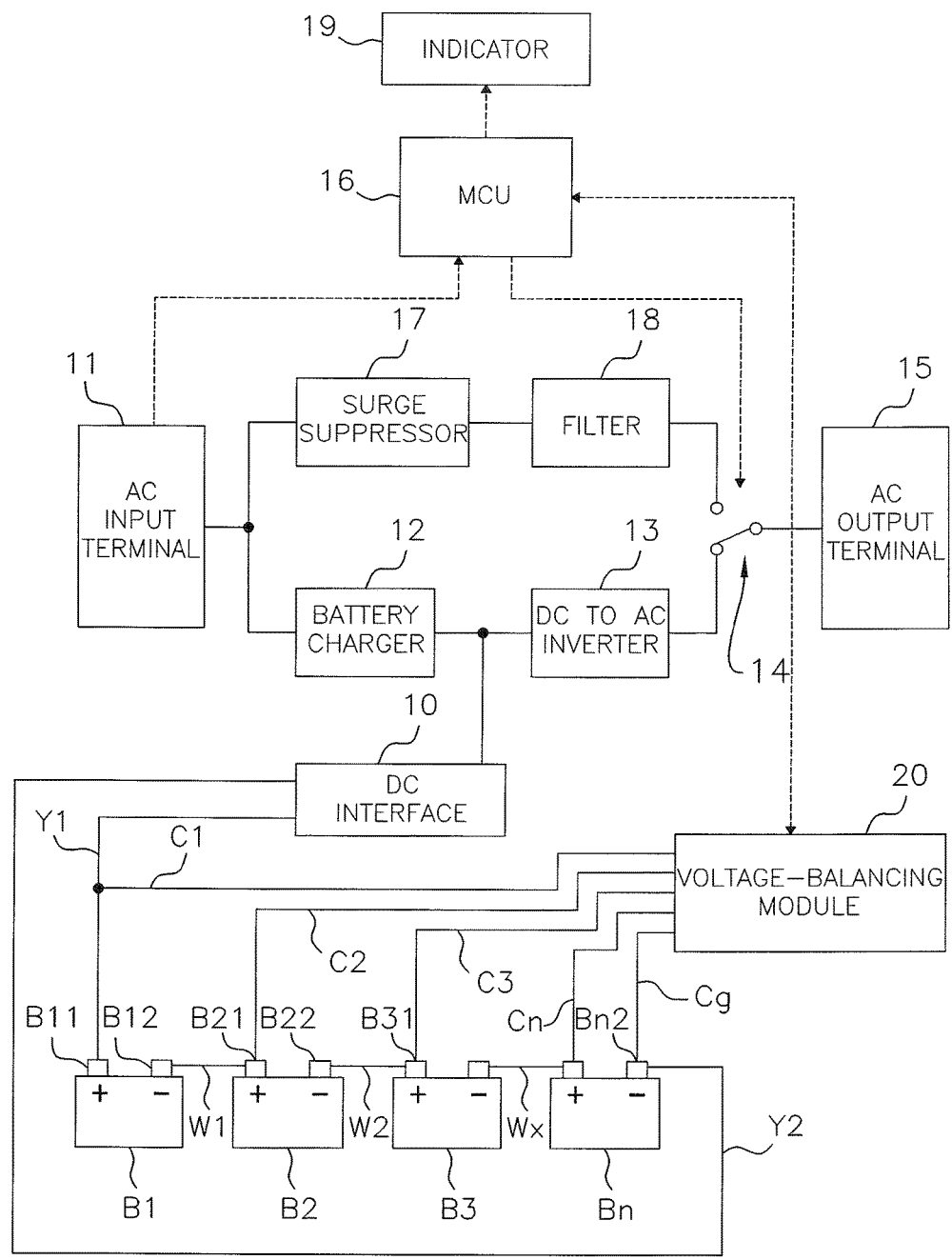
FIG. 7 is a functional block diagram of a second embodiment of a battery apparatus with voltage-balancing control in FIG. 2 in collaboration with a UPS system.

With reference to FIG. 7, a second embodiment of a battery apparatus with voltage-balancing control in accordance with the present invention is substantially the same as the first embodiment of the battery apparatus because the two embodiments share similarities in FIGS. 1, 2 and 4 except that the first one of the voltage detection cables C1 is electrically connected to the positive electrode B11 of the first one of the series-connected batteries B1 and the first line L1 of the voltage-balancing module 20, the second one of the voltage detection cables C2 is electrically connected to the positive electrode B21 of the second one of the series-connected batteries B2 and the second line L2 of the voltage-balancing module 20, the third one of the voltage detection cables C3 is electrically connected to the positive electrode B31 of the third one of the series-connected batteries B3 and the third line L3 of the voltage-balancing module 20, and same analogy applies for connection of the rest of the voltage detection cables.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A battery apparatus with voltage-balancing control, comprising:
   multiple series-connected batteries connected in series to a DC (Direct Current) interface, and charged thereto and discharging therefrom via the DC interface;
   a voltage-balancing module having a processor, multiple voltage-balancing control circuits and multiple voltage detection circuits; and
   a voltage detection cable assembly having multiple voltage detection cables and a ground cable;
   wherein
   the voltage-balancing module detects voltage of the multiple series-connected batteries by virtue of the multiple voltage detection cables and the ground cable;
   each voltage detection circuit serves to detect a voltage value Vn of a respective one of the series-connected batteries;
   the processor of the voltage-balancing module calculates an allowable discharge control parameter Duty of each battery and controls a corresponding voltage-balancing circuit to perform battery discharge of the battery according to the allowable discharge control parameter Duty for voltage of the series-connected batteries to be balanced, and equation for calculating the allowable discharge control parameter Duty of each battery is given by:

$$Duty = K_p * V\text{diff1} + K_i * V(t)$$

where
   Duty is a time duration while battery discharge of the corresponding battery is continuously activated and is controllable through pulse width modulation (PWM);
   Kp and Ki are engineering parameters;
   equation for calculating a first voltage difference value Vdiff1 is: Vdiff1=Vn−Vref1;
   equation for calculating a voltage value at a time t, V(t), is: $V(t) = \int_0^t V\text{diff}\,2$;
   equation for calculating a second voltage difference value Vdiff2 is: Vdiff2=Vn−Vref2; and
   Vref1 and Vref2 are a first reference voltage value and a second reference voltage value respectively.

2. The battery apparatus as claimed in claim 1, wherein equation for calculating the first reference voltage value Vref1 is Vref1=Vmin, wherein Vmin is a minimum value of the multiple voltage values Vn; and
   equation for calculating the second reference voltage value Vref2 is Vref2=Vmin+Voffset, wherein a value of Voffset ranges from 0 to 100 mV;
   Kp is a constant of proportionality;
   Ki is a constant of integration; and
   a cycle for updating each Duty is a time duration from 1 second to 1 minute.

3. The battery apparatus as claimed in claim 1, wherein equation for calculating the first reference voltage value Vref1 and the second reference voltage value Vref2 is Vref1=Vref2=Vave, wherein Vave is an average value of the voltage values Vn of the series-connected batteries;
   Kp is a constant of proportionality;
   Ki is a constant of integration; and
   a cycle for updating each Duty is in a time duration from 1 second to 1 minute.

4. The battery apparatus as claimed in claim 1, wherein the multiple series-connected batteries are connected in series to each other through a power cable assembly and multiple series-connected cables, wherein
   the power cable assembly has:
   a power connector assembly electrically connected to the DC interface;
   at least one first power cable electrically connected to a positive electrode of a first one of the series-connected batteries;
   at least one second power cable electrically connected to a negative electrode of a Nth one of the series-connected batteries, wherein N is an integer; and
   the series-connected cables used to connect the series-connected batteries in series.

5. The battery apparatus as claimed in claim 4, wherein the power connector assembly is integrally formed with a case or includes at least one first power connector and at least one second power connector, and the multiple series-connected batteries are received in a battery box with the power cable assembly extending outwards beyond the battery box.

6. The battery apparatus as claimed in claim 1, wherein a first one of the voltage detection cables is electrically connected to a positive electrode of a first one of the series-connected batteries and a first line of the voltage-balancing module, a second one of the voltage detection cables is electrically connected to a negative electrode of the first one of the series-connected batteries and a second line of the voltage-balancing module, and a third one of the voltage detection cables is electrically connected to a negative electrode of the second one of the series-connected batteries and a third line of the voltage-balancing module.

7. The battery apparatus as claimed in claim 6, wherein a first one of the voltage-balancing control circuits is electrically connected to the first line and the second line of the voltage-balancing module, a first one of the voltage detection circuits is electrically connected to the first line and the second line of the voltage-balancing module, a second one of the voltage-balancing control circuits is electrically connected to the second line and the third line of the voltage-balancing module, and a second one of the voltage detection circuits is electrically connected to the second line and the third line of the voltage-balancing module.

8. The battery apparatus as claimed in claim 1, wherein
the voltage-balancing module has a DC to DC circuit to supply power to the processor; and
a ground line of the voltage-balancing module is electrically connected to a negative electrode of a Nth one of the series-connected batteries through the ground cable of the voltage detection cable assembly, and the multiple voltage-balancing control circuits and the multiple voltage detection circuits are connected to the ground line.

9. The battery apparatus as claimed in claim 1, wherein
the DC interface is installed in an uninterruptible power supply (UPS), wherein the UPS includes:
an AC (Alternating Current) input terminal connected to the mains power;
a battery charger charging the multiple series-connected batteries through the DC interface;
a DC to AC inverter;
a switch;
an AC output terminal; and
an MCU (Microcontroller Unit);
a surge suppressor; and
a filter;
wherein the voltage-balancing module balances voltage of the multiple series-connected batteries, in case of power outage or breakdown, the MCU controls the switch to connect the DC to AC inverter and the AC output terminal, and a discharge path of the multiple series-connected batteries sequentially goes through the DC interface, the DC to AC inverter, the switch and the AC output terminal, and when the mains power recovers, the MCU restores an original state of the switch to establish a mains power supply path sequentially going through the AC input terminal, the surge suppressor, the filter and the AC output terminal.

10. The battery apparatus as claimed in claim 9, wherein the voltage-balancing module further has a communication port, and the MCU of the UPS is connected to an indicator to display voltage-balancing status or voltage-balancing information, the voltage-balancing status or the voltage-balancing information includes the voltage value and the allowable discharge control parameter Duty of each series-connected battery.

11. The battery apparatus as claimed in claim 1, wherein the first one of the voltage detection cables is electrically connected to the positive electrode of the first one of the series-connected batteries and the first line of the voltage-balancing module, the second one of the voltage detection cables is electrically connected to the positive electrode of the second one of the series-connected batteries and the second line of the voltage-balancing module, and the third one of the voltage detection cables is electrically connected to the positive electrode of the third one of the series-connected batteries and the third line of the voltage-balancing module.

12. A method for controlling a battery apparatus with voltage-balancing control, the battery apparatus having multiple series-connected batteries and a voltage-balancing module, wherein the voltage-balancing module has a processor, multiple voltage-balancing control circuits and multiple voltage detection circuits, the method comprising steps of:
detecting multiple voltage values $V_n$ of the respective series-connected batteries through the multiple voltage detection circuits;
calculating a first voltage difference value $Vdiff1$ of each series-connected battery through the processor, wherein equation for calculating the $Vdiff1$ is $Vdiff1=V_n-Vref1$, and equation for calculating the value $Vref1$ is $Vref1=V_{min}$, where $V_{min}$ is a minimum of the multiple voltage values $V_n$ of the series-connected batteries;
calculating a second voltage difference value $Vdiff2$ of each series-connected battery through the processor, wherein equation for calculating the $Vdiff2$ is $Vdiff2=V_n-Vref2$, and equation for calculating the $Vref2$ is $Vref2=V_{min}+Voffset$, wherein $Voffset$ is a design value;
calculating a voltage value $V(t)$ at a time t of each series-connected battery through the processor, wherein equation for calculating the $V(t)$ is $V(t)=\int_0^t Vdiff2$ and $V(t)$ is an accumulated value of every calculation since the beginning;
calculating an allowable discharge control parameter Duty of each series-connected battery through the processor, wherein equation for calculating Duty of each series-connected battery is $Duty=K_p*Vdiff1+K_i*V(t)$, wherein $K_p$ and $K_i$ are engineering constants, and each Duty is a time duration while battery discharge of a corresponding battery is continuously activated and is controllable by way of pulse width modulation (PWM);
controlling the multiple voltage-balancing control circuits to perform battery discharge of the series-connected batteries through the processor to balance the voltage values of the series-connected batteries; and
repeating the foregoing steps to update each Duty until a difference between each two of the multiple series-connected batteries is lowered below a preset value.

13. The method as claimed in claim 12, wherein
the Voffset ranges from 0 to 100 mV;
$K_p$ is a constant of proportionality;
$K_i$ is a constant of integration; and
a cycle for updating each Duty is in a time duration from 1 second to 1 minute.

14. A method for controlling a battery apparatus with voltage-balancing control, the battery apparatus having multiple series-connected batteries and a voltage-balancing module, wherein the voltage-balancing module has a processor, multiple voltage-balancing control circuits and multiple voltage detection circuits, the method comprising steps of:

detecting multiple voltage values Vn of the respective series-connected batteries through the multiple voltage detection circuits;

calculating a first voltage difference value Vdiff1 of each series-connected battery through the processor, wherein equation for calculating the Vdiff1 is Vdiff1=Vn−Vref1, and equation for calculating the value Vref1 is Vref1=Vave, wherein Vave is an average voltage value of the multiple series-connected batteries;

calculating a second voltage difference value Vdiff2 of each series-connected battery through the processor, wherein equation for calculating the Vdiff2 is Vdiff2=Vn−Vref2, and equation for calculating the Vref2 is Vref2=Vave;

calculating a voltage value V(t) at a time t of each series-connected battery through the processor, wherein equation for calculating the V(t) is $V(t) = \int_0^t Vdiff2$ and V(t) is an accumulated value of every calculation since the beginning;

calculating an allowable discharge control parameter Duty of each series-connected battery through the processor, wherein equation for calculating Duty of each series-connected battery is Duty=Kp*Vdiff1+Ki*V(t), wherein Kp and Ki are engineering constants, and each Duty is a time duration while battery discharge of a corresponding battery is continuously activated and is controllable by way of pulse width modulation (PWM);

controlling the multiple voltage-balancing control circuits to perform battery discharge of the series-connected batteries through the processor to balance the voltage values of the series-connected batteries; and repeating the foregoing steps to update each Duty until a difference between each two of the multiple series-connected batteries is lowered below a preset value.

15. The method as claimed in claim 14, wherein

Kp is a constant of proportionality;

Ki is a constant of integration; and a cycle for updating each Duty is in a time duration from 1 second to 1 minute.

\* \* \* \* \*